US009691506B2

(12) United States Patent
Tan et al.

(10) Patent No.: US 9,691,506 B2
(45) Date of Patent: Jun. 27, 2017

(54) HIGH DIELECTRIC INSULATED COAX CABLE FOR SENSITIVE IMPEDANCE MONITORING

(75) Inventors: Daniel Qi Tan, Rexford, NY (US); Michael Joseph Krok, Clifton Park, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 1678 days.

(21) Appl. No.: 12/283,796

(22) Filed: Sep. 16, 2008

(65) Prior Publication Data

US 2010/0067643 A1    Mar. 18, 2010

(51) Int. Cl.
*G21C 17/108* (2006.01)

(52) U.S. Cl.
CPC ........ *G21C 17/108* (2013.01); *G21Y 2002/10* (2013.01); *G21Y 2002/202* (2013.01); *G21Y 2002/204* (2013.01); *G21Y 2002/304* (2013.01); *G21Y 2004/10* (2013.01); *G21Y 2004/30* (2013.01)

(58) Field of Classification Search
CPC .......... H02G 3/00; G01F 23/284; G01T 3/00; G21C 17/108; G21C 17/116; G21C 17/06; G21Y 2002/10; G21Y 2002/202; G21Y 2002/304; G21Y 2004/30
USPC ....... 376/254, 255, 259, 245, 156, 158, 202; 174/124 R, 124 G, 124 GC, 68.1, 110 R
See application file for complete search history.

(56) References Cited

U.S. PATENT DOCUMENTS

| 2,885,521 | A | * | 5/1959 | Fotland | H01C 7/105 252/518.1 |
| 3,243,687 | A | * | 3/1966 | Hoh | H01G 7/02 136/213 |
| 3,350,563 | A | * | 10/1967 | Arnold | G01V 5/10 376/109 |
| 3,674,568 | A | * | 7/1972 | Caprarola | H01L 35/32 136/204 |
| 3,716,450 | A | * | 2/1973 | Lions | G21C 17/112 374/208 |

(Continued)

FOREIGN PATENT DOCUMENTS

| EP | 1361634 A | 11/2003 | |
| EP | 1361634 A1 | * 11/2003 | ............... H02G 3/22 |

(Continued)

OTHER PUBLICATIONS

Obrzut et al., Impedance and Nonlinear Dielectric Testing at High AC Voltages Using Waveforms, IEEE Transactions on Instrumentation and Measurement, vol. 54, No. 4, Aug. 2005, pp. 1570-1574.*

(Continued)

*Primary Examiner* — Jack W Keith
*Assistant Examiner* — Daniel Wasil
(74) *Attorney, Agent, or Firm* — John P. Darling

(57) ABSTRACT

A boiling water reactor core power level monitoring system includes a desired length of high dielectric, non-linear material insulated coaxial type cable in close proximity to the reactor core and a time domain reflectometry apparatus configured to measure a temporary characteristic impedance change associated with the coaxial type cable in response to at least one of neutron or gamma irradiation generated via the reactor core.

3 Claims, 4 Drawing Sheets

(56) References Cited

U.S. PATENT DOCUMENTS

| | | | | |
|---|---|---|---|---|
| 3,796,875 | A * | 3/1974 | Michaelis | G01N 23/222 250/366 |
| 3,803,531 | A * | 4/1974 | Sorensen | G21C 17/116 174/151 |
| 3,872,311 | A * | 3/1975 | Goldstein | G01T 3/006 250/391 |
| 3,909,500 | A * | 9/1975 | Bereza | G21C 17/116 174/11 R |
| 3,961,196 | A * | 6/1976 | Alexeev | H01J 47/12 250/385.1 |
| 3,976,875 | A * | 8/1976 | Engstrom | G01J 1/04 250/216 |
| 4,142,937 | A * | 3/1979 | Eyral | G21C 17/116 376/203 |
| 4,298,430 | A * | 11/1981 | Rolstad | G21C 17/102 374/110 |
| 4,393,025 | A * | 7/1983 | Leyse | G21C 17/112 376/247 |
| 4,404,164 | A * | 9/1983 | Kopp | G01T 3/00 376/154 |
| 4,418,035 | A * | 11/1983 | Smith | G01F 23/22 376/247 |
| 4,565,926 | A * | 1/1986 | Crane | G01T 3/00 250/390.04 |
| 4,617,466 | A * | 10/1986 | Menlove | G01T 3/00 250/390.04 |
| 4,634,568 | A * | 1/1987 | Wimpee et al. | 376/154 |
| 5,141,972 | A * | 8/1992 | Sato | B29C 70/66 521/145 |
| 5,356,484 | A * | 10/1994 | Yater | H01L 35/32 136/200 |
| 5,547,908 | A * | 8/1996 | Furuzawa | C04B 35/465 257/E23.009 |
| 5,889,287 | A * | 3/1999 | Yater | H01L 35/32 257/14 |
| 6,252,923 | B1 * | 6/2001 | Iacovino | G21C 17/06 250/370.05 |
| 6,444,336 | B1 * | 9/2002 | Jia | C04B 35/46 257/E21.272 |
| 6,895,203 | B2 * | 5/2005 | Ozeki | G03G 9/113 399/267 |
| 6,934,350 | B1 * | 8/2005 | Challberg | G21C 5/06 376/353 |
| 6,970,311 | B2 * | 11/2005 | Jaquette | G11B 5/00813 360/46 |
| 7,179,747 | B2 * | 2/2007 | Papa Rao et al. | 438/700 |
| 7,301,254 | B1 * | 11/2007 | Lal | G21H 1/02 310/309 |
| 7,986,760 | B2 * | 7/2011 | Johnson | G21C 19/20 376/268 |
| 8,559,197 | B2 * | 10/2013 | Cullinane | H02P 9/02 363/37 |
| 2002/0177961 | A1 | 11/2002 | Lovergren | |
| 2003/0192582 | A1 * | 10/2003 | Guevara | H01L 35/30 136/205 |
| 2006/0109124 | A1 * | 5/2006 | Dixon | G06K 19/07771 340/572.1 |
| 2007/0117898 | A1 * | 5/2007 | Tan et al. | 524/413 |
| 2007/0128077 | A1 * | 6/2007 | Farmer | G01T 3/008 422/82.01 |
| 2010/0067643 | A1 * | 3/2010 | Tan | G21C 17/108 376/255 |
| 2010/0266084 | A1 * | 10/2010 | Ahlfeld | G21C 1/026 376/207 |
| 2010/0266089 | A1 * | 10/2010 | Ahlfeld | G21C 1/026 376/213 |

FOREIGN PATENT DOCUMENTS

| | | |
|---|---|---|
| JP | S62163942 A | 7/1987 |
| JP | 08054469 A | 2/1996 |
| JP | 2005069779 A | 3/2005 |
| JP | 2005508002 A | 3/2005 |
| JP | 2007163209 A | 6/2007 |
| WO | WO03095954 A | 11/2003 |

OTHER PUBLICATIONS

Insaco, Alumina 99.5% (AL203) Data, Properties, Grades and Tolerances—Supplier Data by Insaco, Mar. 2, 2006, pp. 1-3.*

Fink et al., Long Term High Voltage Tests of the Conductor Insulation of a Superconducting Magnet, 2005 Annual Report Conference on Electrical Insulation and Dielectric Phenomena, p. 357-360.*

Pazik, et al (Structural and Luminescence properties of Eu3+ doped Ba Sr TiO3 (BST) nanocrystalline powders prepared for different methods; Optical Materials, 28, 2006 pp. 1284-1288).*

Robertson et al (Non-linear Ferroelectric Composite Dielectric Materials J. Robertson and B. R. Varlow School of Electrical Engineering University of Manchester, United Kingdom; IEEE Transactions on Dielectrics and Electrical Insulation vol. 12, No. 4; Aug. 2005).*

Lefkowitz et al (Report R 1779; Ferroelectrics; their electrical behavior during and subsequent to ionization radiatio; K. Kramer and P Kroege-et al; Dec. 27, 1965; United States Army Frankford Arsenal Report).*

R. Thomas (Vibration Instrumentation for Nuclear Reactors; Endevco Division of Becton, Dickinson and Company; p. 1-8; International Symposium on Vibration Problems; Apr. 10-12, 1973).*

Lampton et al (Low-distortion resistive anodes for two-dimensional position-sensitive MCP systems M. Lampton and C. W. Carlson Citation: Review of Scientific Instruments 50, 1093 (1979); doi: 10.1063/1.1135990 View online: http://dx.doi.org/10.1063/1.1135990.*

Singh et al, "High and Low Dielectric Constant Materials", The Electrochemical Society Interface, Summer 1999, pp. 26-30.*

JP08054469A English Abstract.

EP1361634A1 English Abstract.

European Search Report and Opinion, Application No. 09165354.3-2208, Feb. 19, 2010.

Keith E. Holbert, Sriram Sankaranarayanan, Steven S. McCready, "Response of Lead Metaniobate Acoustic Emission Sensors to Gamma Irradiation", *IEEE Transactions on Nuclear Science*, vol. 52, No. 6, pp. 2583-2590, Dec. 2005.

Craig Nichol, Roger Beckie, Leslie Smith, "Evaluation of Uncoated and Coated Time Domain Reflectometry Probes for High Electrical Conductivity Systems", *Soil Sci. Soc. Am. J.*, 66:1454-1465, 2002.

Photonis, "Part1: Fundamentals of neutron and gamma detectors", pp. 1-1-1-12.

A. Sternberg, L. Shebanov, E. Birks, H.W. Weber, F.M. Sauerzopf, H. Klima, H.Schwabl, U. Ulmanisk "Radiation Damage of PLAT and PSN Ceramics", *Ferroelectrics*, 1994, vol. 153, pp. 309-314.

Unofficial English translation of JP Office Action issued May 7, 2014 in connection with corresponding JP Patent Application No. 2009-166207.

* cited by examiner

HIGH DIELECTRIC INSULATED COAX CABLE FOR SENSITIVE IMPEDANCE MONITORING

STATEMENT REGARDING FEDERALLY SPONSORED RESEARCH & DEVELOPMENT

This invention was made with U.S. Government support under contract number DE-PC07-07ID14778. The Government has certain rights in the invention.

BACKGROUND

The invention relates generally to local power range monitoring of nuclear reactors, and more specifically to use of a high dielectric insulated coax cable to achieve steady state local power level measurements for a reactor core.

One method of local power range monitoring (LPRM) of a boiling water reactor is based on a traversing incore probe (TIP) technique. FIG. 1 illustrates a boiling water reactor known in the art. One known LPRM method employs a neutron or gamma sensor on the end of a 200 foot helical drive cable to obtain a three dimensional power profile. The associated TIP insertion and withdrawal operations require significant maintenance, are subject to radiation contamination, suffer from slow data collection, require a large foot print, and undesirable spatial inaccuracies.

Another method of local power range monitoring of a boiling water reactor is based on a gamma thermometer for measuring temperature. The gamma thermometer technique however, has a lower accuracy than that associated with TIP techniques, has an unknown lifetime and high maintenance costs.

One proposed method of local power range monitoring of a boiling water reactor is directed to measurement of impedance changes of a mineral insulated coaxial cable that includes ionization of a filled inert gas in a loosely packed Al2O3 or MgO powder. The above proposed method is a newer concept utilizing coaxial cable with time domain reflectometry (TDR) techniques. Although this concept overcomes many of the disadvantages associated with TIP and gamma thermometer techniques known in the art, it still leaves room for increased spatial accuracy.

In view of the foregoing, it would be advantageous to provide a method of local power range monitoring of a boiling water reactor that avoids the above problems.

BRIEF DESCRIPTION

Briefly, in accordance with one embodiment, a boiling water reactor (BWR) core local power range monitoring (LPRM) system comprises:

a desired length of high dielectric mineral insulated coaxial type cable within the boiling water reactor core; and a time domain reflectometry apparatus configured to measure a temporary characteristic impedance change associated with the coaxial type cable in response to at least one of neutron or gamma irradiation generated via the reactor core.

According to another embodiment, a boiling water reactor (BWR) core local power range monitoring (LPRM) system comprises:

at least one high dielectric, non-linear mineral insulated coaxial cable type transmission line bundled together with a plurality of nuclear fuel rods to form a monitoring transmission line assembly, the monitoring transmission line assembly being within the boiling water reactor core along its entire length; and a measurement system configured to measure a temporary characteristic impedance change associated with the at least one coaxial cable type transmission line in response to at least one of neutron or gamma irradiation generated via the reactor core.

According to yet another embodiment, a method of monitoring a boiling water reactor (BWR) core power level, the method comprises:

providing a desired length of high dielectric, non-linear mineral insulated coaxial type cable;

bundling the desired length of high dielectric, non-linear mineral insulated coaxial type cable together with a plurality of fuel cell rods to form a transmission line assembly having a characteristic impedance;

inserting at least a portion of the transmission line assembly within the boiling water reactor core; and measuring a characteristic impedance change associated with the high dielectric, non-linear mineral insulated coaxial type cable in response to at least one of neutron or gamma irradiation generated via the reactor core.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
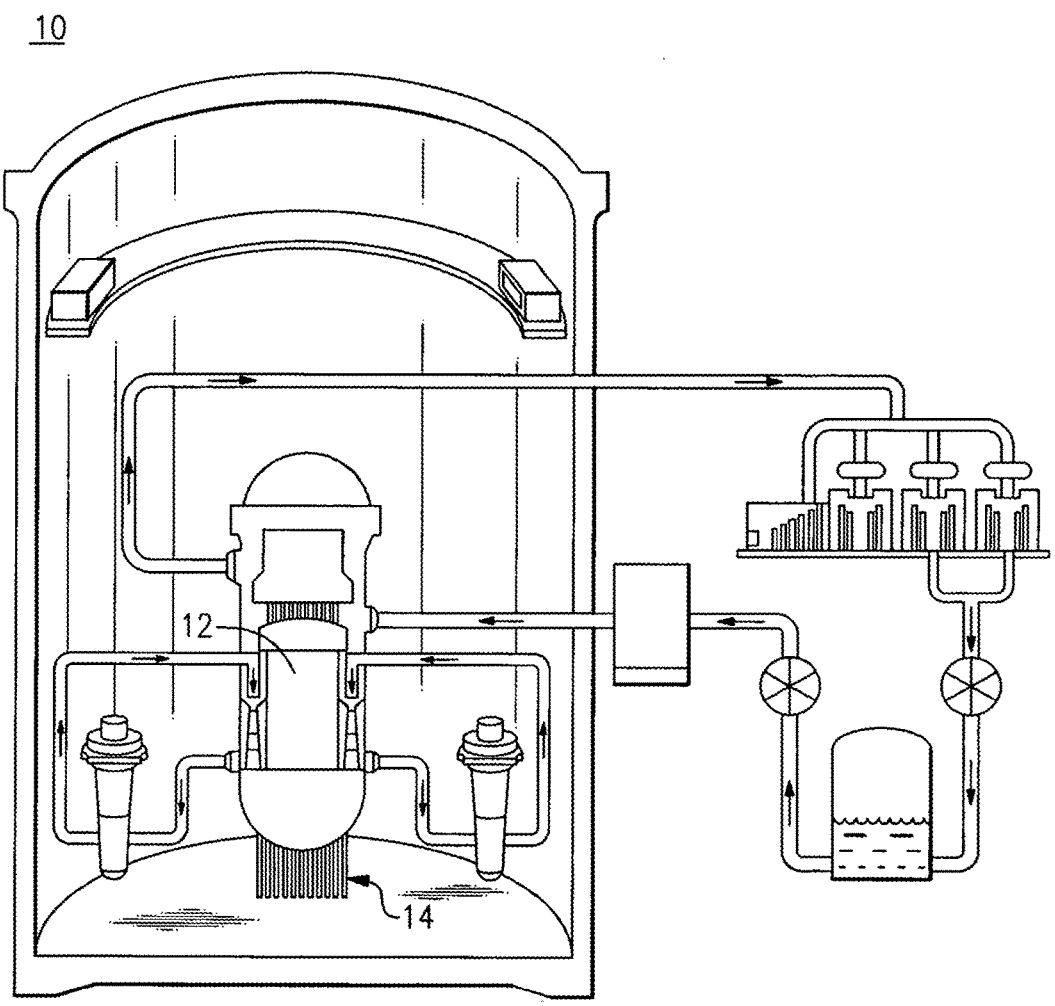
FIG. 1 illustrates a nuclear reactor known in the art.

The embodiments described herein utilize the impedance change of a high dielectric, non-linear mineral insulated coaxial cable under neutron and/or gamma irradiation to measure the local power level to establish a three-dimensional power profile over the full length of a nuclear reactor core such as a boiling water reactor (BWR) core depicted in FIG. 1. Multiple measurements may be taken within seconds and with a spatial resolution of about one-half-inch using a time domain reflectometry (TDR) technique to obtain temporary characteristic impedance changes associated with the high dielectric insulated coaxial cable that is configured as a transmission line. The characteristic impedance is associated with the high dielectric constant change and/or ionization of backfilled inert gas in the coaxial cable caused by the neutron and/or gamma irradiation.

The coaxial cable transmission line embodiments described below with reference to the figures avoids the use of conventional simple oxides such as, without limitation, alumina, silica, magnesia, glass and hafnia, having a low dielectric constant. According to some aspects of the invention, the high dielectric, non-linear mineral insulated coaxial cable uses high dielectric constant ceramics such as nonlinear ferroelectric lead lanthanium zirconium titanium oxide, and sodium niobate antiferroelectrics.

The present inventors recognized that although higher dielectric constants decrease the spatial distance between the interrupting nodes in a transmission line, a higher resolution can be achieved although the signal transmission becomes slower.

According to one embodiment of a method for monitoring a boiling water reactor local power level, at least one portion of a high dielectric, non-linear mineral insulated coaxial cable transmission line is inserted within the boiling water reactor core such that the characteristic impedance change associated with the high dielectric, non-linear mineral insulated coaxial cable transmission line is measured in response to at least one of neutron or gamma irradiation generated via the reactor core. This technique advantageously achieves a higher spatial accuracy and resolution than that achievable using known techniques and materials. Other advantages over known systems and methods include, without limitation, 1) capability to collect multiple data sets within a couple of seconds as contrasted with about two-hours required using existing TIP techniques; 2) no requirement for use of inert gas to facilitate the impedance change since high dielectric materials such as ceramics show considerable change in their dielectric properties under irradiation; 3) filled gas and its ionization under irradiation can be leveraged simultaneously with loosely packed powder when required to change the characteristic impedance; 4) high dielectric materials are more resistant to gamma or neutron radiation and exhibit a longer lifetime; and 5) use of high dielectric insulator coaxial cable transmission line provides a monitoring system that is less expensive to implement than known monitoring systems and techniques.

The embodiments described below in more detail with reference to the figures employ dielectric materials in a coaxial cable configuration that are different from conventional oxide or nitride dielectrics generally used to formulate coaxial cables. These different dielectric materials can be in the form of a dielectric powder that is tightly packed to provide a uniform distribution of the powder, and thus improved coaxial cable quality. Some embodiments make use of ionization of inert gas such as, without limitation, N2, Ar, Xe and/or combinations thereof. The present inventors recognized that the combined effect of gas ionization and the direct change of the dielectric constant under irradiation may offer additional information regarding impedance changes.

Cable configurations that employ loosely packed powder in combination with inert gas can also utilize gas ionization in combination with impedance changes of the loosely packed powder to significantly increase the TDR signal quality and sensitivity.

Looking again at FIG. 1, a conventional nuclear reactor 10 can be seen to include a boiling water reactor core 12. A plurality of instrumentation tubes 14 are integrated into the BWR core 12 and are configured such that at least one sensor such as a neutron and/or gamma sensor can be inserted into each tube 14 to accommodate local power range monitoring via known flux detection techniques.

Figure 2:
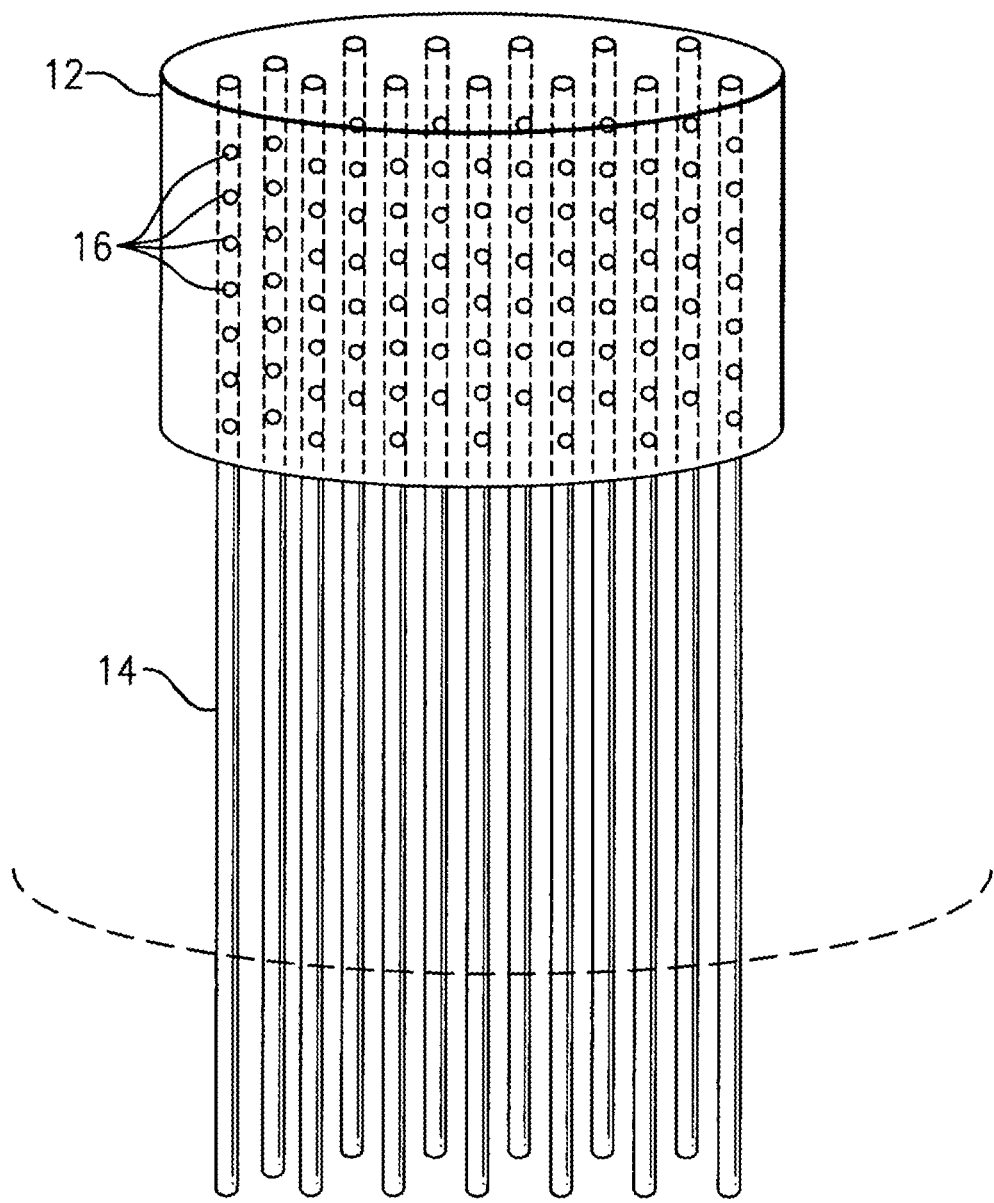
FIG. 2 illustrates the reactor core and instrumentation tubes depicted in FIG. 1 in greater detail.

FIG. 2 illustrates the reactor core 12 and instrumentation tubes 14 in greater detail. Each tube 14 generally includes a minimum of 7-9 monitoring points 16, but in one embodiment will have one monitoring point spaced at one inch increments along the full length of the reactor core.

Figure 3:
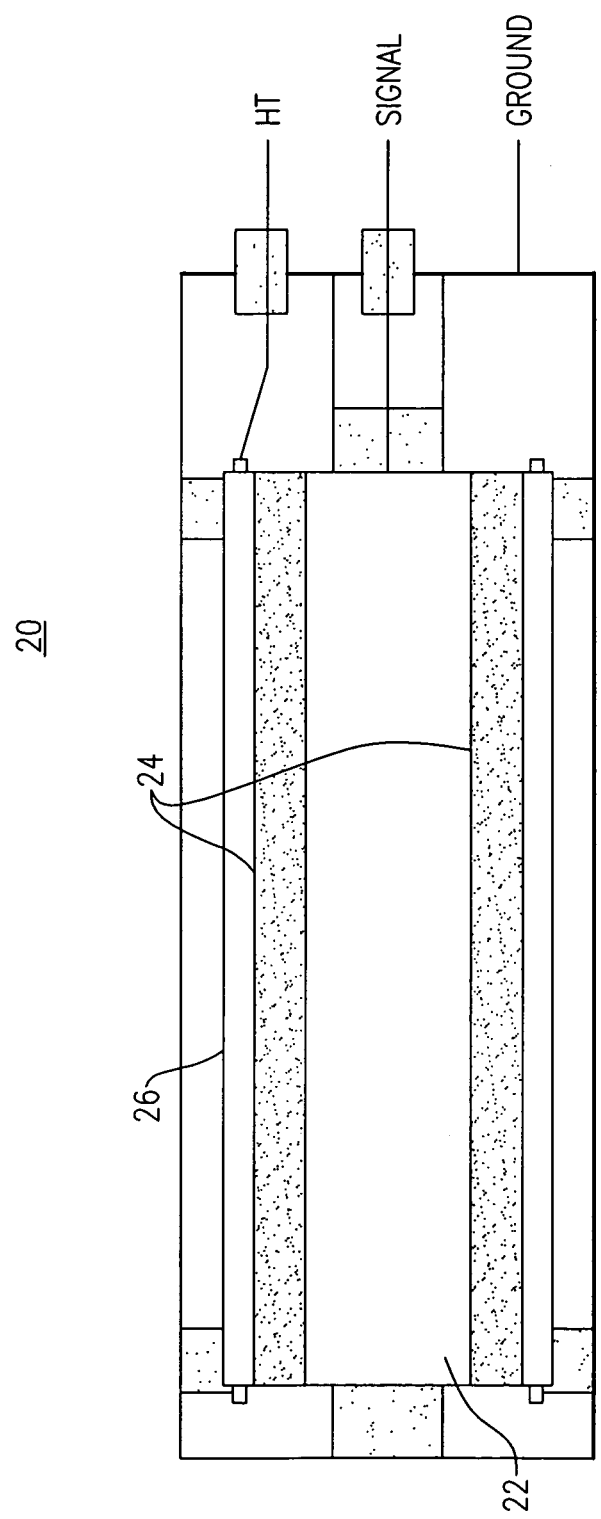
FIG. 3 is a length of high dielectric insulated coaxial type cable, according to one embodiment of the invention.
Figure 4:
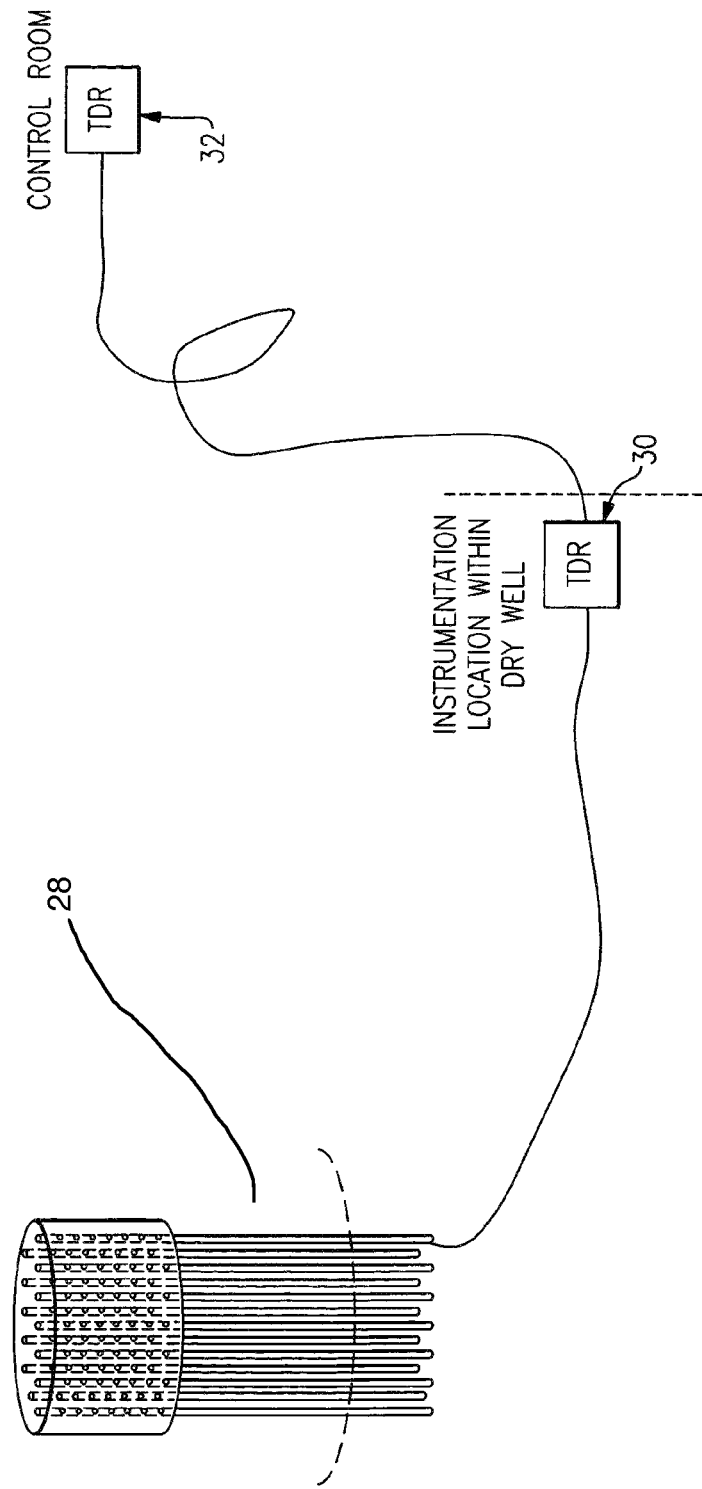
FIG. 4 illustrates a plurality of TDR measurement instrumentation locations suitable for use with the high dielectric insulated coaxial type cable shown in FIG. 3, according to one embodiment of the invention.

FIG. 3 illustrates a high dielectric, non-linear mineral insulated coaxial type cable 20, according to one embodiment of the invention. The high dielectric, non-linear mineral insulated coaxial type cable 20 may be bundled together with a plurality of reactor rods (typically four rods) inserted into the reactor core 12 to form a measurement device assembly. A plurality of such measurement device assemblies are inserted into the reactor core 12 to provide the desired LPRM data. The instrumentation tubes 14 shown in FIGS. 1 and 2 are thus replaced via the measurement device assemblies such that each tube 14 corresponds to a measurement device assembly 28 as shown in FIG. 4 according to one aspect of the invention.

High dielectric insulated coaxial type cable 20 comprises an inner electrical conducting electrode (anode) 22 that is protected by an insulator layer 24. The insulator layer 24 avoids the use of conventional low permittivity materials including simple oxides such as, without limitation, alumina, silica, magnesia, glass and hafnia, having a low dielectric constant. The insulator layer 24 also avoids the use of loosely packed powders and the use of inert gas alone or in combination with loosely packed powders, thus avoiding the possibility of powder agglomeration and non-uniform distribution, which may decrease the TDR signal quality and certainty of appropriate explanation of the data, among other things, as stated above.

According to some aspects of the invention, the high dielectric, non-linear mineral insulated coaxial type cable 20 uses high permittivity, non-linear, high dielectric constant material(s) including without limitation, ceramics such as nonlinear ferroelectric lead lanthanium zirconium titanium oxide, and sodium niobate antiferroelectrics to form the insulator layer 24 and thus achieve the advantages described above. Other high dielectric constant, nonlinear materials can include lead zirconium titanium oxide ($PbZrTiO_3$), barium titanate ($BaTiO_3$), barium strontium titanate ($BaSrTiO_3$), lanthanum modified bismuth titanium oxide (($BiLa$)$_4Ti_3O_{12}$), strontium bismuth tantalum oxide ($SrBi_2Ta_2O_9$), lead zirconate ($PbZrO_3$), lead magnesium niobate oxide ($PbMgNbO_3$), lead magnesium niobium titanium oxide ($PbMgNbTiO_3$), lead nickel niobium zirconium titanium oxide ($PbNiNb$—$PbZrTiO_3$).

Some embodiments of the high dielectric, non-linear mineral insulated coaxial type cable 20 may employ a combination of linear and non-linear dielectric materials to form the insulator layer 24 and to achieve additional advantages such as, without limitation, high temperature stability. The high permittivity, non-linear materials were found by the present inventors be provide greater sensitivity to radiation exposure via the characteristic impedance change(s) associated with the high dielectric, non-linear mineral insulated coaxial type cable 20 resulting from the radiation exposure, especially since the impedance is related to the permittivity. A permittivity (dielectric constant) that is greater than about ten (10) is suitable to provide a workable solution according to the principles described herein; while a higher permittivity level, i.e. greater than about 30, will provide more desirable results. The dielectric constant may be as high as about 100,000 for some high dielectric materials. In the previous two cases, the outer ground electrode shown in FIG. 3 may be removed leaving a simple coaxial cable design that consists of only a high permittivity nonlinear insulator 24 between the two electrodes 22, 26, wherein the outer electrode 26 is the coaxial cable shield electrode.

The insulator layer 24 in some embodiments may employ a combination of high dielectric, non-linear material(s) and an inert gas such that the change in characteristic impedance caused by the radiation exposure is a function of the ionization of the inert gas in combination with the directly activated impedance change of the high dielectric, non-linear material(s).

High dielectric, non-linear mineral insulated coaxial type cable 20 also comprises an outer electrical conducting electrode (cathode) 26 that forms a shield for the inner electrical conducting electrode 22, and that may be used to assist in generating the TDR data. Time domain reflectometry (TDR) measurement techniques are used to determine the characteristic terminating impedance and the location of impedance changes along the coaxial transmission line. A TDR employs a very fast rise time voltage step wave generator and a wide bandwidth oscilloscope in an arrangement representing a closed-loop-radar. An incident voltage step wave, launched from a step wave generator into a coaxial transmission line, travels forward and propagates toward the far end of the coaxial transmission line. Any change of the initial characteristic impedance encountered along the length of the coaxial transmission line causes part of the energy of the incident voltage step wave to be reflected back into the coaxial transmission line in the reverse direction toward the step wave generator. The incident voltage amplitude and reflected voltage amplitude are measured to determine the amount of impedance change caused by the terminating characteristic impedance changes occurring along the length of the coaxial transmission line. TDR measurement techniques are well known and documented in the literature, and so further details regarding TDR measurement techniques are not described herein in order to preserve brevity and enhance clarity in understanding the embodiments described herein.

According to one embodiment, electronic measurement instrumentation to determine the amount and location of changed terminating characteristic impedance along the coaxial transmission line in the reactor core 12 and establish steady state local power information based on the gamma flux requires:

1) a high dielectric, non-linear mineral insulated coaxial transmission line with a tightly packed high dielectric, non-linear insulation material optionally backfilled with inert gas to provide a transmission path from the bottom of the nuclear reactor vessel 10 to the top of the reactor core 12 in each and every desired sensor location (which would include every typical LPRM location according to one embodiment);

2) a very fast rise time voltage step wave generator that functions in an environment up to 150 degrees Fahrenheit inside the reactor containment, (or can be remotely located in an acceptable environment to maintain life and reliable operation);

3) an impedance output matching/coupling network for coupling the output of the voltage step wave generator to both an electronic coaxial transmission line switch assembly and a coaxial transmission line to the electronic instrumentation circuitry monitoring the time and the value of the incident and the reflected voltage amplitude;

4) an electronic coaxial transmission line switch assembly with sufficient bandwidth to switch and maintain the wave shape integrity of the very fast voltage step wave with a one nanosecond or less rise time from the output of the step wave generator through the electronic switch to a coaxial transmission line in a LPRM sensor and any reflected voltage from the coaxial transmission line in the reactor core, wherein the electronic coaxial transmission line switch assembly switches the voltage step wave from the step wave generator to any one single LPRM sensor or to all of the LPRM sensors sequentially;

5) a spare coaxial transmission line in a reactor containment electrical penetration that maintains the wave shape integrity of the incident and reflected voltage components comprising the TDR voltage signature;

6) signal digitizing and storage circuitry, digital sampling rate (10 gigahertz, minimum), and adequate digital storage memory to capture, store and maintain the analog signal integrity of at least 200 sequentially returning TDR voltage signatures;

7) signal processing circuitry necessary to continually assess the incident and reflected voltage components along the coaxial transmission line inside the reactor core 12 to determine the characteristic terminating impedance equated to an equivalent reactor power level;

8) time processing circuitry necessary to correlate the characteristic terminating impedance changes to the locations of the terminating characteristic impedance occurring the along the coaxial transmission line inside the reactor core 12, wherein the exact location of the characteristic terminating impedance requires time processing that incrementally accounts and corrects for the total accumulated signal propagation delay due to all previously occurring locations with changed characteristic terminating impedance that causes a change of the velocity of signal propagation;

9) electronic circuitry to control the electronic coaxial transmission line switch assembly with a differential or coaxial serialized control signal to select one single LPRM sensor or all of the LPRM sensors sequentially, wherein the serialized control signal is sent to the electronic coaxial transmission line switch by a differential or coaxial transmission line; and 10) a spare coaxial transmission line or two spare conductors to create a differential transmission line within a reactor containment electrical penetration that transmits a differential or coaxial serialized control signal to the coaxial transmission line switch assembly.

The plurality of measurement device assemblies formed by the high dielectric insulated coaxial type cables 20 and corresponding reactor rods that are inserted into the reactor core 12 advantageously are easily replaceable and are fixed in position, thus avoiding the necessity for moving parts associated with known LPRM measurement techniques.

FIG. 4 illustrates TDR electronic measurement instrumentation at plurality of locations suitable for use with the high dielectric, non-linear mineral insulated coaxial transmission line, according to one embodiment of the invention. One suitable TDR measurement instrumentation location 30 is disposed within the nuclear reactor 10 dry well. Another suitable TDR measurement instrumentation location 32 is disposed within a control room located away from the nuclear reactor 10.

In summary explanation, a temporary change in the characteristic impedance of a coaxial transmission line that is proportional to the radiation level is utilized to obtain steady state local power level information in order to calibrate instrumentation and to establish a three-dimensional power profile of a nuclear reactor core with an electronic system that has no moving parts. Time domain reflectometry measurements performed on a simple and inexpensive, rigid/hardline, high dielectric, non-linear mineral insulated coaxial transmission line in LPRM sensor locations will continuously obtain an axial scan of the nuclear reactor radiation level(s) over the full length of a nuclear reactor core that is proportional to the radiation level.

The embodiments and principles described herein, unlike existing technology that requires steady state conditions, allow either transient or steady state condition monitoring, opening a new regime of monitoring previously unavailable using known techniques. Further, existing technology generally performs one measurement every one inch, while the embodiments and principles described herein allows for a lesser number of measurements, or allows retention of the one inch technique, but with the added benefit of doing so at a very fast rate (seconds using the principles described above compared with hours using known techniques and methods).

While only certain features of the invention have been illustrated and described herein, many modifications and changes will occur to those skilled in the art. It is therefore, to be understood that the appended claims are intended to cover all such modifications and changes as fall within the true spirit of the invention.

The invention claimed is:

1. A method of measuring impedance change in a boiling water reactor (BWR), the method comprising:
    packing a high dielectric constant, non-linear mineral powder along a desired length of an electrical conducting electrode to provide an insulated coaxial type cable comprising a high dielectric constant, non-linear mineral powder insulator devoid of powder agglomeration and uniformly distributed along the desired length;
    bundling the desired length of high dielectric, non-linear mineral insulated coaxial cable together with a plurality of nuclear fuel rods to form a transmission line assembly having a characteristic impedance;
    inserting at least a portion of the transmission line assembly within the boiling water reactor core;
    backfilling an inert gas into the high dielectric constant, non-linear mineral powder insulator; and
    measuring a characteristic impedance change associated with the high dielectric constant, non-linear mineral powder insulated coaxial type cable in response to at least one of neutron or gamma irradiation generated via the reactor core.

2. The method according to claim 1, further comprising measuring a change in the ionization level of the inert gas in response to at least one of neutron or gamma irradiation generated via the reactor core.

3. The method according to claim 1, wherein providing a desired length of high dielectric constant, non-linear mineral powder insulated coaxial type cable comprises providing a high dielectric, non-linear mineral powder insulated coaxial type cable having a length equal to or greater than the length of the reactor core.

* * * * *